(12) United States Patent
Rourke

(10) Patent No.: US 9,074,114 B2
(45) Date of Patent: Jul. 7, 2015

(54) ISOCYANURATE VINYL ESTER ANCHORING ADHESIVE COMPOSITION

(75) Inventor: Andrew J. Rourke, Bartlett, IL (US)

(73) Assignee: Illinois Tool Works Inc., Glenview, IL (US)

( * ) Notice: Subject to any disclaimer, the term of this patent is extended or adjusted under 35 U.S.C. 154(b) by 191 days.

(21) Appl. No.: 13/110,504

(22) Filed: May 18, 2011

(65) Prior Publication Data

US 2012/0296038 A1 Nov. 22, 2012

(51) Int. Cl.
| | | |
|---|---|---|
| C09J 177/12 | (2006.01) | |
| C04B 26/16 | (2006.01) | |
| C04B 40/06 | (2006.01) | |
| C09J 4/00 | (2006.01) | |
| F16B 13/14 | (2006.01) | |
| C09J 131/04 | (2006.01) | |
| C09J 129/12 | (2006.01) | |
| C04B 111/00 | (2006.01) | |
| C08F 222/10 | (2006.01) | |

(52) U.S. Cl.
CPC .............. C09J 177/12 (2013.01); *C09J 131/04* (2013.01); *C09J 129/12* (2013.01); *C04B 2111/00637* (2013.01); C04B 26/16 (2013.01); C04B 40/0666 (2013.01); *C04B 2111/00715* (2013.01); C09J 4/00 (2013.01); F16B 13/145 (2013.01); *C08F 222/1006* (2013.01)

(58) Field of Classification Search
CPC ...... C09J 131/00; C09J 131/02; C09J 133/04; C09J 129/12; C09J 4/00; C09J 131/04; C04B 2111/00637; C04B 2111/00715
See application file for complete search history.

(56) References Cited

U.S. PATENT DOCUMENTS

| | | | |
|---|---|---|---|
| 5,157,072 A | 10/1992 | Hense et al. | |
| 5,250,591 A * | 10/1993 | Fujii et al. | 523/521 |
| 5,854,305 A | 12/1998 | Schwiegk et al. | |
| 5,965,635 A | 10/1999 | Rancich et al. | |
| 6,228,207 B1 | 5/2001 | Rancich et al. | |
| 6,291,555 B1 | 9/2001 | Surjan et al. | |
| 6,402,434 B1 | 6/2002 | Surjan et al. | |
| 6,403,678 B1 | 6/2002 | Surjan et al. | |
| 6,416,256 B1 | 7/2002 | Surjan et al. | |
| 6,420,458 B1 | 7/2002 | Surjan et al. | |
| 6,822,017 B2 | 11/2004 | Kish et al. | |
| 7,163,971 B2 | 1/2007 | Rancich et al. | |
| 7,226,650 B2 | 6/2007 | Liu et al. | |
| 7,368,170 B2 | 5/2008 | Liu et al. | |
| 7,411,010 B2 | 8/2008 | Kish et al. | |
| 7,544,739 B2 | 6/2009 | Liu et al. | |
| 7,687,551 B2 * | 3/2010 | Mgaya et al. | 522/86 |
| 2004/0157997 A1 * | 8/2004 | Liu et al. | 525/187 |

FOREIGN PATENT DOCUMENTS

| | | | |
|---|---|---|---|
| DE | 195 31 649 A1 | 3/1997 | |
| JP | 10259358 A * | 9/1998 | C09J 4/02 |
| WO | WO 02/100966 A1 | 12/2002 | |
| WO | WO 2007/042199 A1 | 4/2007 | |
| WO | WO 2009/131321 A2 | 10/2009 | |

OTHER PUBLICATIONS

English Translation of JP 10-259358 A; Sep. 1998; Bando et al.*

* cited by examiner

*Primary Examiner* — Karuna P Reddy
(74) *Attorney, Agent, or Firm* — Pauley Petersen & Erickson

(57) ABSTRACT

An anchoring adhesive includes effective amounts of an isocyanurate compound and a vinyl ester compound that react and cure to form a composition having high compressive strength, high tensile strength and low shrinkage. The anchoring adhesive can be used to firmly bond anchor pins to boreholes in concrete, steel, wood, and other substrates.

19 Claims, 1 Drawing Sheet

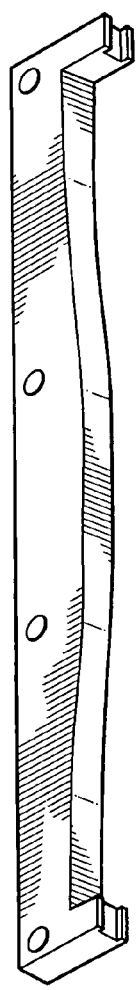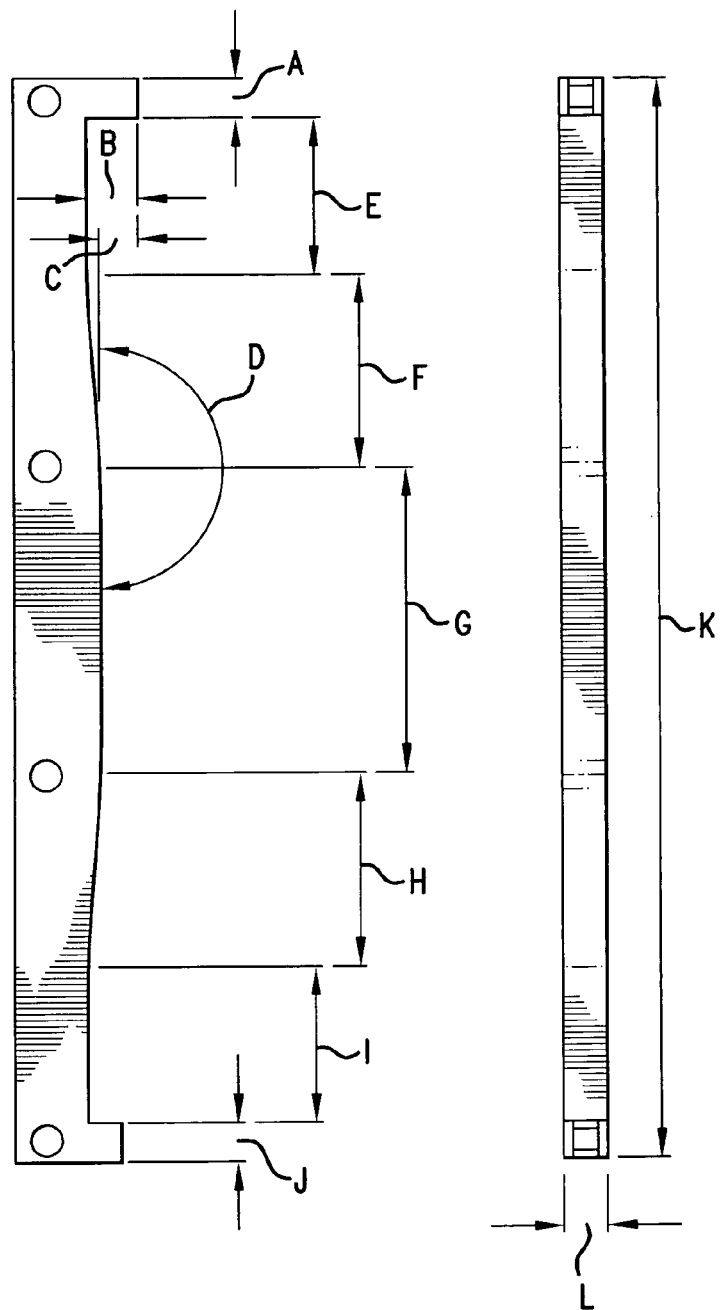
FIG. 1  FIG. 2  FIG. 3

US 9,074,114 B2

ISOCYANURATE VINYL ESTER ANCHORING ADHESIVE COMPOSITION

FIELD OF THE INVENTION

This invention is directed to an anchoring adhesive composition used to maintain anchor pins in boreholes, which has excellent compressive strength and tensile strength, and minimal shrinkage during curing.

BACKGROUND OF THE INVENTION

Anchoring adhesives are used to maintain anchor pins in boreholes that are upside down and vertical, or horizontal, or oriented at any angle. The anchoring adhesives and anchor pins are useful in industrial or commercial construction applications such as bridges, airports, highways, skyscrapers, stadiums and tunnels. In a typical application, a borehole is drilled into a substrate member formed of concrete, steel, wood, or a combination thereof, or another material. Then, the interior of the borehole is cleaned and scrubbed to remove dust and dirt particles. Then, the borehole is filled with a measured amount of anchoring adhesive. Then, a driving tool is used to drive an anchor pin into the borehole.

A typical anchor pin is elongated and made of steel. The anchor pin may be threaded or non-threaded and may have a flat or pointed end. The driving tool may be a hammer, or may be a power tool that employs hammering and/or rotational motion.

Some anchoring adhesives and methods of applying them are disclosed in U.S. Pat. No. 6,291,555, issued to Surjan et al.; U.S. Pat. No. 6,402,434, issued to Surjan et al.; U.S. Pat. No. 6,403,678, issued to Surjan et al.; U.S. Pat. No. 6,416,256, issued to Surjan et al.; U.S. Pat. No. 6,420,458, issued to Surjan et al.; U.S. Pat. No. 7,226,650, issued to Liu et al.; and U.S. Pat. No. 7,368,170, issued to Liu et al. These patents are incorporated herein by reference in their entireties.

Additional anchoring adhesives and methods of applying them are disclosed in U.S. Pat. No. 7,411,010, issued to Kish et al.; U.S. Pat. No. 7,163,971, issued to Rancich et al.; U.S. Pat. No. 6,822,017, issued to Kish et al.; U.S. Pat. No. 6,228,207, issued to Rancich et al. and U.S. Pat. No. 5,965,635, issued to Rancich et al. These patents are incorporated herein by reference in their entireties.

Due to the heavy duty nature of most anchor pin applications, it is important that the anchoring adhesive maintain a strong adhesive bond between the anchor pin and the borehole under a wide variety of conditions. Properties of anchoring adhesive that are considered important in end use applications include high compressive strength, high tensile strength, and low shrinkage during curing. There is a need or desire for anchoring adhesives that demonstrate improvements in these and other properties.

SUMMARY OF THE INVENTION

This present invention is directed to an anchoring adhesive that exhibits high compressive strength, high tensile strength, and low thermal shrinkage, when used to bind an anchor pin to a borehole. The anchoring adhesive includes a first part A and a second part B in a weight ratio of about 1:4 to about 40:1. The first part A includes an isocyanurate compound and a vinyl ester compound. The second part B includes a free radical initiator.

The first part A and second part B are initially separate from each other and may be present in separate capsules inside an anchoring adhesive cartridge, slug or package. During use, the cartridge, slug or package of anchoring adhesive can be placed in a borehole or immediately above a borehole. When a tool is used to drive an anchor pin into the borehole, the driving force ruptures the capsules, if present, and causes the first part A and second part B to mix together and chemically react in the interstitial spaces between the anchor pin and the interior of the borehole.

Upon mixing of the first part A and the second part B, the isocyanurate compound reacts with the vinyl ester compound to create a polymer that is believed to include uniquely shaped crosslinks which both strengthen the polymer and resist elevated temperature creep. The chemical reaction advantageously occurs quickly, with minimal set time, at ambient temperature. The anchoring adhesive provides excellent adhesion between various substrate materials that can be used for the anchor pin and the borehole.

With the foregoing in mind, it is a feature and advantage of the invention to provide an anchoring adhesive that exhibits excellent strength properties and low shrinkage during curing. These and other features and advantages of the invention will become further apparent from the following detailed description of the preferred embodiments. The detailed description is considered to be merely illustrative rather than limiting, the scope of the invention being defined by the appended claims and equivalents thereof.

BRIEF DESCRIPTION OF THE DRAWINGS

FIG. 1 is a perspective view of a dog-bone shaped test specimen used in the tensile testing of anchoring adhesive compositions described below.

FIG. 2 is a front view of the dog-bone shaped test specimen of FIG. 1.

FIG. 3 is a side view of the dog-bone shaped test specimen of FIG. 1.

DETAILED DESCRIPTION OF THE PREFERRED EMBODIMENTS

The present invention is an anchoring adhesive including a first part A and a second part B. The first part A and second part B are present in weight ratios of about 1:4 to about 40:1, suitably about 1:3 to about 30:1, or about 1:2 to about 20:1, or about 1:1 to about 10:1.

The first part A includes and isocyanurate compound and a vinyl ester compound. The isocyanurate compound may be selected from compounds having the following chemical formula:

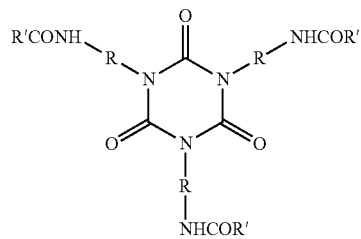

Wherein each R and R' is allyl, alkyl or aryl.

Suitably, the isocyanurate compound can be sleeted from isocyanurate acrylates, isocyanurate diacrylates, isocyanurate triacrylates, and combinations thereof. The isocyanurate compound can be a monomer or a polymer, and is suitably a monomer. One particularly suitable isocyanurate compound is tris(2-hydroxy ethyl)isocyanurate triacrylate. This isocyanurate compound is a monomer, and is available from Sartomer USA, LLC under the trade name SR368. The structure of isocyanurate, as exemplified by the following structure of tris(2-hydroxy ethyl)isocyanurate triacrylate, lends itself to forming unique crosslinks with vinyl ester that strengthen the polymer lattice and resist elevated temperature creep:

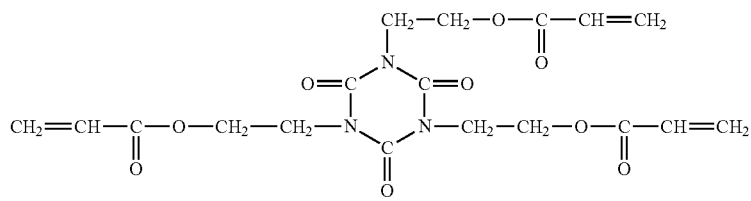 [SMILES: C=CC(=O)OCCn1c(=O)n(CCOC(=O)C=C)c(=O)n(CCOC(=O)C=C)c1=O]

The vinyl ester compound can be a monomer or a polymer, and is suitably a polymer. The vinyl ester compound can be selected from polymers having the following chemical formula:

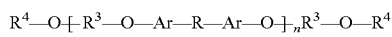

wherein

Ar is a substituted or unsubstituted aromatic radical with a valence of at least two, R is independently a substituted or unsubstituted divalent radical derived from alkyl or arylalkyl, $R^3$ is a hydroxy substituted divalent radical derived from an alkyl radical, $R^4$ is independently a vinyl carboxy radical or a epoxy radical, provided that the ratio of n to the number of vinyl carboxy $R^4$ groups is, on average for the composition, from about 0.4 to about 2.0, and n is from 1 to 5.

A particularly suitable vinyl ester compound is available from Reichhold Chemical Co. under the tradename Norpol Dion Ver 9165. This product contains 64.5% by weight of a vinyl ester having the following chemical formula, and 35.5% by weight vinyl toluene.

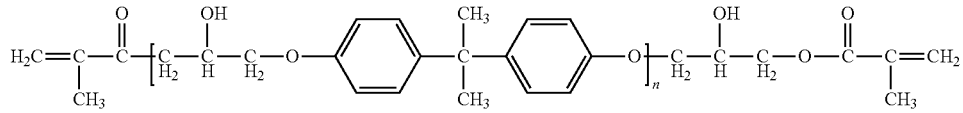

where n is from 1 to about 5 and wherein the ratio of n to the terminal vinyl units is, on average for the composition, from about 0.4 to about 2.0.

The first part A may include about 1-30% by weight of the isocyanurate compound, suitably about 1-20% by weight, or about 2-10% by weight. The first part A may include about 3-50% by weight of the vinyl ester compound, suitably about 5-40% by weight, or about 8-30% by weight. As noted above, the first part A may also include an additional monomer. Suitable monomers include without limitation a vinyl monomer, an acrylate, diacrylate or triacrylate monomer, and combinations thereof. The additional monomer may constitute zero to about 40% by weight of the first part A, suitably about 1-30% by weight, or about 2-20% by weight. When present, the additional monomer may also participate in the chemical (crosslinking) reaction between the isocyanurate compound and the vinyl ester compound.

The first part A may also include about 20-70% by combined weight of one or more fillers, suitably about 30-70% by weight, or about 30-60% by weight. Suitable fillers include without limitation glass fibers, silicon dioxide (silica), titanium dioxide, quartz sand, other sands, and combinations thereof. The first part A may also include about 0.01-10% by combined weight of one or more thixotropic agents, suitably about 0.05-5% by weight, or about 0.1-4% by weight. Suitable thixotropic agents include without limitation formed silica, polycarboxylic acid amides, urea compounds, and combinations thereof. Thixotropic agents cause the anchoring adhesive to become more fluid (less viscous) as its components are mixed together.

The first part A may also include minor amounts of catalysts, chain extenders, flame retardants, fragrances and the like. While a catalyst may be included in the first part A, this catalyst is typically not a free radical initiator of the type that is typically included in the second part B. Exemplary catalysts and chain extenders useful in the first part A include without limitation diethylol-p-toluidine, n-dodecyl mercaptan, and the like.

The second part B may include about 5-80% by weight of a free radical initiator, suitably about 10-50% by weight, or about 15-40% by weight. Suitable free radical initiators include without limitation peroxide compounds, tertiary amine compounds, aldehyde amine compounds, organic sulfonyl chlorides, and combinations thereof. One suitable free radical initiator is available from Arkema Inc. under the trade name AFR40. This product is a mixture of 40% by weight dibenzoyl peroxide, 40% by weight dibutyl phthalate, and 20% by weight water.

The second part B may also include about 20-80% by weight of a thickening agent, suitably about 20-65% by weight, or about 20-50% by weight. Suitable thickening agents include without limitation monosilica, organic and inorganic clays, and other very fine, inert particulate materials.

The second part B may also include a liquid carrier in an amount of zero to about 50% by weight, suitably about 10-45% by weight or about 15-40% by weight. Suitable liquid carriers include water and organic solvents such as alcohols, ethers and ketones. Additionally, the second part B may include suitable amounts of pigments, fillers and the like.

The first part A and second part B may be present in separate first and second capsules and may be combined in a single cartridge, slug or package of anchoring adhesive. The first and second capsules can be formed of glass, plastic or a membrane material. One of the first and second capsules can be smaller than the other of the first and second capsules and contained within the other of the first and second capsules.

Suitably, the first part A is contained within a first, larger capsule and the second part B is contained within a second, smaller capsule, and the second capsule is contained within the first capsule.

The cartridge, slug or package of anchoring adhesive may contain the first and second capsules and may have a narrow, elongated shape which fits easily into the borehole. When a tool is used to drive an anchor pin into the borehole, the first and second capsules rupture and the first and second parts A and B mix together, resulting in chemical reaction, crosslinking and adhesion between the anchor pin and the inner surfaces of the borehole. The anchoring adhesion of the invention forms a strong adhesive bond and exhibits high tensile and compressive strengths and minimal shrinkage.

EXAMPLES

Several experimental anchoring adhesives were formulated using the ingredients listed in Table 1.

The foregoing ingredients were formulated into anchoring adhesive compositions, with control compositions A7 from Illinois Tool Works Inc. and HY-150 from HiltiAltengesellschaft, and experimental compositions A7+−1, A7+−2, A7+−3, . . . , through A7+−95. Physical properties of Compressive Strength, Tensile Strength, Tensile Modules and Shrinkage were measured for many of the anchoring adhesive compositions, using the test procedures described below. The following Table 2 describes the anchoring adhesive compositions and sets forth the test results.

As shown below, the anchoring adhesives formulated using the isocyanurate compound (represented by ingredient PRO 12128) in combination with the vinyl ester compound (represented by ingredient DION 9165) generally had higher compression strengths and higher tensile strengths than the anchoring adhesives that omitted one or both of these ingredients, and also exhibited excellent (low) shrinkage values.

TABLE 1

| Anchoring Adhesive Ingredients | | | |
|---|---|---|---|
| Trade Name | Supplier | Chemical Name | Purpose |
| C2208 | ITW -Red Head | 70% Methyl Methacrylate/30% Polymethylmethacrylate | Monomer/Resin |
| SR350 | Sartomer | TRIMETHYLOLPROPANE TRIMETHACRYLATE | Monomer |
| SR540 | Sartomer | ETHOXYLATED (4) BISPHENOL A DIMETHACRYLATE | Monomer |
| SR368 | Sartomer | TRIS (2-HYDROXY ETHYL) ISOCYANURATE TRIACRYLATE | Monomer |
| SR833S | Sartomer | TRICYCLODECANE DIMETHANOL DIACRYLATE | Monomer |
| PRO12128 | Sartomer | 30% SR368/70% SR833S (proprietary composition) | Monomers |
| DION 9165 | Reichhold | 64.5% DEGBPA Vinyl Ester/35.5% Vinyl Toluene | Resin/Monomer |
| Ethylene Glycol | Various | Ethylene Glycol | Monomer |
| Pulcra 5710 | Pulcra Chemical Company | diethylol-p-toluidine | Catalyst |
| NDM | Arkema | n-DODECYL MERCAPTAN | Chain Extender |
| Fragrance 16332 | Atlanta Fragrance Company | unknown | Fragrance |
| Aerosil R 202 | Evonik | Hydrophobically modified fumed silica | Thixotropic Agent |
| Aerosil R974 | Evonik | Hydrophillically modified fumed silica | Thixotropic Agent |
| BYK-R605 | BYK | Solution of polyhydroxycarboxylic acid amides | Thixotropic Agent |
| BYK-E401 | BYK | Solution of a modified urea | Thixotropic Agent |
| TS720 | Cabot Corp | Hydrophobically modified fumed silica | Thixotropic Agent |
| Micral 9400 | J. M. Huber Corporation | Aluminum trihydrate | Flame Retardant |
| Microglass M9132 | Fibertec, Inc. | Milled glass fiber (15 μm diameter × ~150 μm Length) | Reinforcing Filler |
| Sand 100/140 | AGSCO | Quartz Sand (100-140 mesh) | Reinforcing Filler |
| Silcosil 63 | US Silica | Crystalline silica (<63 μm) | Reinforcing Filler |
| TiPure R900 | DuPont | Titanium Dioxide | Pigment |
| AFR 40 | Arkema | 40% Dibenzoyl Peroxide/40% Dibutyl Pthalate/20% Water | Free Radical Initiator |
| Tamsil 8 | TAM | microsilica | Thickening Agent |
| Tixogel VZ | Southern Clay Products | organoclay | Thickening Agent |
| VC 80000 | American Colors, Inc | Black Iron Oxide Paste | Pigment |

TABLE 2

Anchoring Adhesive Compositions And Test Results

| | Controls | | Crosslinker-Fiber | | | | | Catalysis | | |
|---|---|---|---|---|---|---|---|---|---|---|
| | A7 | HY-150 | A7 + -1 | A7 + -2 | A7 + -3 | A7 + -4 | A7 + -5 | A7 + -6 | A7 + -7 | A7 + -8 |

Resin Side (Part A)

| | | | | | | | | | | |
|---|---|---|---|---|---|---|---|---|---|---|
| C2208 | 39.88% | | 36.26% | 30.70% | 33.25% | 36.26% | 30.70% | 40.20% | 39.88% | 39.88% |
| SR350 | | | | | | | | | | |
| SR540 | | | 4.53% | 11.51% | 8.31% | 4.53% | 11.51% | | | |
| PRO12128 | | | | | | | | | | |
| SR833S | | | | | | | | | | |
| DION 9165 | | | | | | | | | | |
| Ethylene Glycol | | | | | | | | | | |
| HET | 0.50% | | 0.45% | 0.38% | 0.42% | 0.45% | 0.38% | 0.10% | 0.10% | 0.90% |
| NDM | 0.50% | | 0.45% | 0.38% | 0.42% | 0.45% | 0.38% | 0.10% | 0.90% | 0.10% |
| F16332 | 0.30% | | 0.27% | 0.23% | 0.25% | 0.27% | 0.23% | 0.30% | 0.30% | 0.30% |
| R202 | 3.99% | | 3.63% | 3.07% | 3.33% | 3.63% | 3.07% | 4.02% | 3.99% | 3.99% |
| R974 | | | | | | | | | | |
| BYK-605 | | | | | | | | | | |
| BYK-E401 | | | | | | | | | | |
| TS720 | | | | | | | | | | |
| M9400 | 4.99% | | 4.53% | 3.84% | 4.16% | 4.53% | 3.84% | 5.03% | 4.98% | 4.98% |
| Glass Fibers | | | 12.47% | 12.47% | 31.17% | 49.86% | 49.88% | | | |
| Sand 100/140 | 49.85% | | 37.40% | 37.41% | 18.70% | | | 50.25% | 49.85% | 49.85% |
| Silicosil 63 | | | | | | | | | | |
| R900 | | | | | | | | | | |

Activator Side (Part B)

| | | | | | | | | | | |
|---|---|---|---|---|---|---|---|---|---|---|
| AFR40 | 48.72 | | 48.72 | 48.72 | 48.72 | 48.72 | 48.72 | 48.72 | 48.72 | 48.72 |
| Tamsil 8 | | | | | | | | | | |
| Tixogel VZ | 1.98 | | 1.98 | 1.98 | 1.98 | 1.98 | 1.98 | 1.98 | 1.98 | 1.98 |
| Sand 100/140 | 48.95 | | 48.95 | 48.95 | 48.95 | 48.95 | 48.95 | 48.95 | 48.95 | 48.95 |
| VC 80000 | 0.36 | | 0.36 | 0.36 | 0.36 | 0.36 | 0.36 | 0.36 | 0.36 | 0.36 |

Physical Properties

| | | | | | | | | | | |
|---|---|---|---|---|---|---|---|---|---|---|
| Compressive Strength, psi | 1,643 | 9,400 | 6,494 | 10,000 | 9,411 | 6,386 | 10,815 | 5,073 | | |
| Tensile Strength, psi | 1,615 | 577 | 2,112 | 1,874 | 2,608 | 2,924 | 3,467 | 1,744 | | |
| Tensile Modulus, ksi | 1,025 | 187 | 1,036 | 984 | 1,197 | 1,501 | 1,511 | 803 | | |
| Shrinkage | | | | | | | | | | |

| | Catalysis | Microsilica-Isocyanurate | | | Original | Sand/Microsilica/Glass Fiber DOE | | | | |
|---|---|---|---|---|---|---|---|---|---|---|
| | A7 + -9 | A7 + -10 | A7 + -11 | A7 + -12 | A7 + -13 | A7 + -14 | A7 + -15 | A7 + -16 | A7 + -17 | A7 + -18 |

Resin Side (Part A)

| | | | | | | | | | | |
|---|---|---|---|---|---|---|---|---|---|---|
| C2208 | 39.56% | 0.48% | 0.54% | 0.52% | 39.88% | 39.88% | 39.88% | 39.88% | 39.88% | 39.88% |
| SR350 | | | | | | | | | | |
| SR540 | | | 13.60% | 13.07% | | | | | | |
| PRO12128 | | | 4.09% | 7.86% | | | | | | |
| SR833S | | | | | | | | | | |
| DION 9165 | | | | | | | | | | |
| Ethylene Glycol | | | | | | | | | | |
| HET | 0.89% | 0.01% | 0.01% | 0.01% | 0.50% | 0.50% | 0.50% | 0.50% | 0.50% | 0.50% |
| NDM | 0.89% | 0.01% | 0.01% | 0.01% | 0.50% | 0.50% | 0.50% | 0.50% | 0.50% | 0.50% |
| F16332 | 0.30% | 0.00% | 0.00% | 0.00% | 0.30% | 0.30% | 0.30% | 0.30% | 0.30% | 0.30% |
| R202 | 3.96% | 0.05% | 0.05% | 0.05% | 3.99% | 3.99% | 3.99% | 3.99% | 3.99% | 3.99% |
| R974 | | | | | | | | | | |
| BYK-605 | | | | | | | | | | |
| BYK-E401 | | | | | | | | | | |
| TS720 | | | | | | | | | | |
| M9400 | 4.95% | 0.06% | 0.07% | 0.07% | 4.99% | 4.99% | 4.99% | 4.99% | 4.99% | 4.99% |
| Glass Fibers | | 72.28% | 51.02% | 49.01% | | 24.93% | | 8.31% | 24.93% | |
| Sand 100/140 | 49.45% | | 30.61% | 29.40% | 49.85% | | 49.85% | 8.31% | | 49.85% |
| Silicosil 63 | | 27.11% | | | | 24.93% | | 33.23% | 24.93% | |
| R900 | | | | | | | | | | |

Activator Side (Part B)

| | | | | | | | | | | |
|---|---|---|---|---|---|---|---|---|---|---|
| AFR40 | 48.72 | 48.72 | 48.72 | 48.72 | 49.5 | 48.72 | 48.72 | 48.72 | 48.72 | 48.72 |
| Tamsil 8 | | | | | 29.7 | | | | | |
| Tixogel VZ | 1.98 | 1.98 | 1.98 | 1.98 | 19.8 | 1.98 | 1.98 | 1.98 | 1.98 | 1.98 |
| Sand 100/140 | 48.95 | 48.95 | 48.95 | 48.95 | | 48.95 | 48.95 | 48.95 | 48.95 | 48.95 |
| VC 80000 | 0.36 | 0.36 | 0.36 | 0.36 | 0.99 | 0.36 | 0.36 | 0.36 | 0.36 | 0.36 |

TABLE 2-continued

Anchoring Adhesive Compositions And Test Results

Physical Properties

| | | | | | | | | | |
|---|---|---|---|---|---|---|---|---|---|
| Compressive Strength, psi | 12,013 | 11,042 | 9,241 | 1,284 | 2,965 | 3,325 | 2,991 | 2,847 | 3,290 |
| Tensile Strength, psi | 2,805 | 2,690 | 2,515 | 1,367 | 1,359 | 2,025 | 1,495 | 837 | 2,202 |
| Tensile Modulus, ksi | 1,300 | 1,144 | 1,191 | 1,022 | 954 | 1,267 | 1,106 | 836 | 1,645 |
| Shrinkage | | | | | | | | | |

Sand/Microsilica/Glass Fiber DOE

| | A7+-19 | A7+-20 | A7+-21 | A7+-22 | A7+-23 | A7+-24 | A7+-25 | A7+-26 | A7+-27 | A7+-28 |
|---|---|---|---|---|---|---|---|---|---|---|
| Resin Side (Part A) | | | | | | | | | | |
| C2208 | 39.88% | 39.88% | 39.88% | 39.88% | 39.88% | 39.88% | 39.88% | 39.88% | 39.88% | 39.88% |
| SR350 | | | | | | | | | | |
| SR540 | | | | | | | | | | |
| PRO12128 | | | | | | | | | | |
| SR833S | | | | | | | | | | |
| DION 9165 | | | | | | | | | | |
| Ethylene Glycol | | | | | | | | | | |
| HET | 0.50% | 0.50% | 0.50% | 0.50% | 0.50% | 0.50% | 0.50% | 0.50% | 0.50% | 0.50% |
| NDM | 0.50% | 0.50% | 0.50% | 0.50% | 0.50% | 0.50% | 0.50% | 0.50% | 0.50% | 0.50% |
| F16332 | 0.30% | 0.30% | 0.30% | 0.30% | 0.30% | 0.30% | 0.30% | 0.30% | 0.30% | 0.30% |
| R202 | 3.99% | 3.99% | 3.99% | 3.99% | 3.99% | 3.99% | 3.99% | 3.99% | 3.99% | 3.99% |
| R974 | | | | | | | | | | |
| BYK-605 | | | | | | | | | | |
| BYK-E401 | | | | | | | | | | |
| TS720 | | | | | | | | | | |
| M9400 | 4.99% | 4.99% | 4.99% | 4.99% | 4.99% | 4.99% | 4.99% | 4.99% | 4.99% | 4.99% |
| Glass Fibers | | 49.85% | | 8.31% | 20.77% | 33.23% | 49.85% | 16.62% | | 24.93% |
| Sand 100/140 | | | | 33.23% | 20.77% | 8.31% | | 16.62% | 24.93% | 24.93% |
| Silicosil 63 | 49.85% | | 49.85% | 8.31% | 8.31% | 8.31% | | 16.62% | 24.93% | |
| R900 | | | | | | | | | | |
| Activator Side (Part B) | | | | | | | | | | |
| AFR40 | 48.72 | 48.72 | 48.72 | 48.72 | 48.72 | 48.72 | 48.72 | 48.72 | 48.72 | 48.72 |
| Tamsil 8 | | | | | | | | | | |
| Tixogel VZ | 1.98 | 1.98 | 1.98 | 1.98 | 1.98 | 1.98 | 1.98 | 1.98 | 1.98 | 1.98 |
| Sand 100/140 | 48.95 | 48.95 | 48.95 | 48.95 | 48.95 | 48.95 | 48.95 | 48.95 | 48.95 | 48.95 |
| VC 80000 | 0.36 | 0.36 | 0.36 | 0.36 | 0.36 | 0.36 | 0.36 | 0.36 | 0.36 | 0.36 |

Physical Properties

| | | | | | | | | | | |
|---|---|---|---|---|---|---|---|---|---|---|
| Compressive Strength, psi | 2,967 | | 2,438 | 3,226 | 2,888 | 2,622 | 1,903 | 3,253 | 2,848 | 3,006 |
| Tensile Strength, psi | 1,323 | 1,073 | 1,532 | 2,458 | 1,981 | 1,108 | 712 | 1,532 | 1,111 | 1,786 |
| Tensile Modulus, ksi | 1,100 | 1,010 | 1,039 | 1,346 | 1,116 | 1,021 | 937 | 1,114 | 1,231 | 1,010 |
| Shrinkage | | | | | | | | | | |

Sand/Microsilica/Glass Fiber DOE | High Potential Monomer Screening

| | A7+-29 | A7+-30 | A7+-31 | A7+-32 | A7+-33 | A7+-34 | A7+-35 | A7+-36 | A7+-37 | A7+-38 |
|---|---|---|---|---|---|---|---|---|---|---|
| Resin Side (Part A) | | | | | | | | | | |
| C2208 | 39.88% | 39.88% | 39.88% | 39.88% | | | | | | |
| SR350 | | | | | 6.61% | | 10.17% | | 20.35% | |
| SR540 | | | | | 4.07% | 10.17% | 30.52% | 10.17% | | |
| PRO12128 | | | | | 4.07% | | | 30.52% | | 20.35% |
| SR833S | | | | | 19.33% | 30.52% | | | 20.35% | 20.35% |
| DION 9165 | | | | | 6.61% | | | | | |
| Ethylene Glycol | | | | | | | | | | |
| HET | 0.50% | 0.50% | 0.50% | 0.50% | 0.25% | 0.25% | 0.25% | 0.25% | 0.25% | 0.25% |
| NDM | 0.50% | 0.50% | 0.50% | 0.50% | 0.25% | 0.25% | 0.25% | 0.25% | 0.25% | 0.25% |
| F16332 | 0.30% | 0.30% | 0.30% | 0.30% | 0.31% | 0.31% | 0.31% | 0.31% | 0.31% | 0.31% |
| R202 | 3.99% | 3.99% | 3.99% | 3.99% | 2.34% | 2.34% | 2.34% | 2.34% | 2.34% | 2.34% |
| R974 | | | | | | | | | | |
| BYK-605 | | | | | | | | | | |
| BYK-E401 | | | | | | | | | | |
| TS720 | | | | | | | | | | |
| M9400 | 4.99% | 4.99% | 4.99% | 4.99% | 5.09% | 5.09% | 5.09% | 5.09% | 5.09% | 5.09% |
| Glass Fibers | | 9.97% | 9.97% | 9.97% | 12.82% | 12.82% | 12.82% | 12.82% | 12.82% | 12.82% |
| Sand 100/140 | 24.93% | | 4.99% | 7.48% | | | | | | |
| Silicosil 63 | 24.93% | 39.88% | 34.90% | 32.40% | 38.25% | 38.25% | 38.25% | 38.25% | 38.25% | 38.25% |
| R900 | | | | | | | | | | |
| Activator Side (Part B) | | | | | | | | | | |
| AFR40 | 48.72 | 48.72 | 48.72 | 48.72 | 48.72 | 48.72 | 48.72 | 48.72 | 48.72 | 48.72 |
| Tamsil 8 | | | | | | | | | | |
| Tixogel VZ | 1.98 | 1.98 | 1.98 | 1.98 | 1.98 | 1.98 | 1.98 | 1.98 | 1.98 | 1.98 |

TABLE 2-continued

Anchoring Adhesive Compositions And Test Results

| | | | | | | | | | | |
|---|---|---|---|---|---|---|---|---|---|---|
| Sand 100/140 | 48.95 | 48.95 | 48.95 | 48.95 | 48.95 | 48.95 | 48.95 | 48.95 | 48.95 | 48.95 |
| VC 80000 | 0.36 | 0.36 | 0.36 | 0.36 | 0.36 | 0.36 | 0.36 | 0.36 | 0.36 | 0.36 |

Physical Properties

| | | | | | | | | | | |
|---|---|---|---|---|---|---|---|---|---|---|
| Compressive Strength, psi | 3,159 | | | | 13,617 | 12,838 | 10,567 | 9,812 | 12,303 | 11,051 |
| Tensile Strength, psi | 2,344 | | | | 1,501 | 2,528 | 1,860 | 2,772 | 2,385 | 2,888 |
| Tensile Modulus, ksi | 1,270 | | | | 1,171 | 1,153 | 1,167 | 1,074 | 1,251 | 954 |
| Shrinkage | | | | | 1.57% | 1.82% | 1.44% | 1.34% | 2.03% | 1.40% |

High Potential Monomer Screening

| | A7+-39 | A7+-40 | A7+-41 | A7+-42 | A7+-43 | A7+-44 | A7+-45 | A7+-46 | A7+-47 | A7+-48 |
|---|---|---|---|---|---|---|---|---|---|---|

Resin Side (Part A)

| | | | | | | | | | | |
|---|---|---|---|---|---|---|---|---|---|---|
| C2208 | | | | | | | | | | |
| SR350 | | 4.07% | | 30.52% | 20.35% | | | 19.33% | | 4.07% |
| SR540 | 30.52% | 19.33% | | 10.17% | | 30.52% | 30.52% | 6.61% | 20.35% | 4.07% |
| PRO12128 | | 6.61% | 20.35% | | | | 10.17% | 4.07% | | 19.33% |
| SR833S | 10.17% | 4.07% | | | | | 10.17% | 4.07% | | 6.61% |
| DION 9165 | | 6.61% | 20.35% | | 20.35% | | | 6.61% | 20.35% | 6.61% |
| Ethylene Glycol | | | | | | | | | | |
| HET | 0.25% | 0.25% | 0.25% | 0.25% | 0.25% | 0.25% | 0.25% | 0.25% | 0.25% | 0.25% |
| NDM | 0.25% | 0.25% | 0.25% | 0.25% | 0.25% | 0.25% | 0.25% | 0.25% | 0.25% | 0.25% |
| F16332 | 0.31% | 0.31% | 0.31% | 0.31% | 0.31% | 0.31% | 0.31% | 0.31% | 0.31% | 0.31% |
| R202 | 2.34% | 2.34% | 2.34% | 2.34% | 2.34% | 2.34% | 2.34% | 2.34% | 2.34% | 2.34% |
| R974 | | | | | | | | | | |
| BYK-605 | | | | | | | | | | |
| BYK-E401 | | | | | | | | | | |
| TS720 | | | | | | | | | | |
| M9400 | 5.09% | 5.09% | 5.09% | 5.09% | 5.09% | 5.09% | 5.09% | 5.09% | 5.09% | 5.09% |
| Glass Fibers | 12.82% | 12.82% | 12.82% | 12.82% | 12.82% | 12.82% | 12.82% | 12.82% | 12.82% | 12.82% |
| Sand 100/140 | | | | | | | | | | |
| Silicosil 63 | 38.25% | 38.25% | 38.25% | 38.25% | 38.25% | 38.25% | 38.25% | 38.25% | 38.25% | 38.25% |
| R900 | | | | | | | | | | |

Activator Side (Part B)

| | | | | | | | | | | |
|---|---|---|---|---|---|---|---|---|---|---|
| AFR40 | 48.72 | 48.72 | 48.72 | 48.72 | 48.72 | 48.72 | 48.72 | 48.72 | 48.72 | 48.72 |
| Tamsil 8 | | | | | | | | | | |
| Tixogel VZ | 1.98 | 1.98 | 1.98 | 1.98 | 1.98 | 1.98 | 1.98 | 1.98 | 1.98 | 1.98 |
| Sand 100/140 | 48.95 | 48.95 | 48.95 | 48.95 | 48.95 | 48.95 | 48.95 | 48.95 | 48.95 | 48.95 |
| VC 80000 | 0.36 | 0.36 | 0.36 | 0.36 | 0.36 | 0.36 | 0.36 | 0.36 | 0.36 | 0.36 |

Physical Properties

| | | | | | | | | | | |
|---|---|---|---|---|---|---|---|---|---|---|
| Compressive Strength, psi | 10,352 | 11,735 | 10,469 | 9,773 | 13,881 | 12,235 | 10,530 | 12,643 | 11,751 | 11,719 |
| Tensile Strength, psi | 1,662 | 2,375 | 2,241 | 1,592 | 2,438 | 2,270 | 2,237 | 1,900 | 2,512 | 2,192 |
| Tensile Modulus, ksi | 800 | 848 | 1,204 | 1,102 | 1,147 | 886 | 780 | 991 | 891 | 1,102 |
| Shrinkage | 1.46% | 1.15% | 1.10% | 2.30% | 1.55% | 1.60% | 1.23% | 1.44% | 1.28% | 1.51% |

| | High Potential Monomer Screening | | | | | | | | | Filler Loading |
|---|---|---|---|---|---|---|---|---|---|---|
| | A7+-49 | A7+-50 | A7+-51 | A7+-52 | A7+-53 | A7+-54 | A7+-55 | A7+-56 | A7+-57 | A7+-58 |

Resin Side (Part A)

| | | | | | | | | | | |
|---|---|---|---|---|---|---|---|---|---|---|
| C2208 | | | | | | | | | | |
| SR350 | 10.17% | 10.17% | 20.35% | 6.61% | | | | 10.17% | 10.17% | |
| SR540 | 30.52% | 10.17% | | 6.61% | | 23.83% | 15.26% | | 30.52% | |
| PRO12128 | | 10.17% | 20.35% | 4.07% | | | 25.43% | | | 10.16% |
| SR833S | | 10.17% | | 4.07% | 20.35% | 16.86% | | | | |
| DION 9165 | | | | 19.33% | 20.35% | | | 30.52% | | 30.49% |
| Ethylene Glycol | | | | | | | | | | |
| HET | 0.25% | 0.25% | 0.25% | 0.25% | 0.25% | 0.25% | 0.25% | 0.25% | 0.25% | 0.51% |
| NDM | 0.25% | 0.25% | 0.25% | 0.25% | 0.25% | 0.25% | 0.25% | 0.25% | 0.25% | 0.51% |
| F16332 | 0.31% | 0.31% | 0.31% | 0.31% | 0.31% | 0.31% | 0.31% | 0.31% | 0.31% | 0.30% |
| R202 | 2.34% | 2.34% | 2.34% | 2.34% | 2.34% | 2.34% | 2.34% | 2.34% | 2.34% | 2.44% |
| R974 | | | | | | | | | | |
| BYK-605 | | | | | | | | | | |
| BYK-E401 | | | | | | | | | | |
| TS720 | | | | | | | | | | |
| M9400 | 5.09% | 5.09% | 5.09% | 5.09% | 5.09% | 5.09% | 5.09% | 5.09% | 5.09% | 5.08% |
| Glass Fibers | 12.82% | 12.82% | 12.82% | 12.82% | 12.82% | 12.82% | 12.82% | 12.82% | 12.82% | 10.10% |
| Sand 100/140 | | | | | | | | | | |
| Silicosil 63 | 38.25% | 38.25% | 38.25% | 38.25% | 38.25% | 38.25% | 38.25% | 38.25% | 38.25% | 40.41% |
| R900 | | | | | | | | | | |

TABLE 2-continued

Anchoring Adhesive Compositions And Test Results

Activator Side (Part B)

| | | | | | | | | | | |
|---|---|---|---|---|---|---|---|---|---|---|
| AFR40 | 48.72 | 48.72 | 48.72 | 48.72 | 48.72 | 48.72 | 48.72 | 48.72 | 48.72 | 48.72 |
| Tamsil 8 | | | | | | | | | | |
| Tixogel VZ | 1.98 | 1.98 | 1.98 | 1.98 | 1.98 | 1.98 | 1.98 | 1.98 | 1.98 | 1.98 |
| Sand 100/140 | 48.95 | 48.95 | 48.95 | 48.95 | 48.95 | 48.95 | 48.95 | 48.95 | 48.95 | 48.95 |
| VC 80000 | 0.36 | 0.36 | 0.36 | 0.36 | 0.36 | 0.36 | 0.36 | 0.36 | 0.36 | 0.36 |

Physical Properties

| | | | | | | | | | | |
|---|---|---|---|---|---|---|---|---|---|---|
| Compressive Strength, psi | 10,251 | 12,343 | 13,137 | 12,516 | 13,698 | 11,655 | 10,095 | 14,668 | 12,084 | 11,657 |
| Tensile Strength, psi | 1,896 | 2,449 | 2,160 | 2,244 | 3,033 | 2,471 | 2,717 | 2,738 | 1,814 | 2,828 |
| Tensile Modulus, ksi | 771 | 776 | 1,198 | 1,214 | 1,117 | 824 | 851 | 874 | 727 | 971 |
| Shrinkage | 1.51% | 1.57% | 0.00% | 1.17% | 1.51% | 1.45% | 1.37% | 1.48% | 1.57% | 1.69% |

| | Filler Loading | | % Filler/% Monomer/% Glass DOE | | | | | | | |
|---|---|---|---|---|---|---|---|---|---|---|
| | A7 + -59 | A7 + -60 | A7 + -61 | A7 + -62 | A7 + -63 | A7 + -64 | A7 + -65 | A7 + -67 | A7 + -68 | A7 + -69 |

Resin Side (Part A)

| | | | | | | | | | | |
|---|---|---|---|---|---|---|---|---|---|---|
| C2208 | | | | | | | | | | |
| SR350 | | | | | | | | | | |
| SR540 | | | | | | | | | | |
| PRO12128 | 8.86% | 6.73% | 6.47% | 8.26% | 3.73% | 7.10% | 3.32% | 4.10% | 4.10% | 10.20% |
| SR833S | | | | | | | | | | |
| DION 9165 | 26.59% | 20.18% | 30.61% | 24.70% | 33.34% | 33.60% | 29.64% | 36.60% | 36.60% | 30.50% |
| Ethylene Glycol | | | | | | | | | | |
| HET | 0.44% | 0.34% | 0.46% | 0.40% | 0.46% | 0.50% | 0.40% | 0.50% | 0.50% | 0.50% |
| NDM | 0.44% | 0.34% | 0.46% | 0.40% | 0.46% | 0.50% | 0.40% | 0.50% | 0.50% | 0.50% |
| F16332 | 0.27% | 0.20% | 0.27% | 0.24% | 0.27% | 0.30% | 0.24% | 0.30% | 0.30% | 0.30% |
| R202 | 2.13% | 1.61% | 2.19% | 1.94% | 2.19% | 2.40% | 1.94% | 2.40% | 2.40% | 2.40% |
| R974 | | | | | | | | | | |
| BYK-605 | | | | | | | | | | |
| BYK-E401 | | | | | | | | | | |
| TS720 | | | | | | | | | | |
| M9400 | 4.43% | 3.36% | 4.55% | 4.05% | 4.55% | 5.00% | 4.05% | 5.00% | 5.00% | 5.00% |
| Glass Fibers | 11.37% | 13.45% | 5.43% | | | | | 5.10% | 10.10% | |
| Sand 100/140 | | | | | | | | | | |
| Silicosil 63 | 45.47% | 53.80% | 49.57% | 60.00% | 55.00% | 50.60% | 60.00% | 45.50% | 40.50% | 50.60% |
| R900 | | | | | | | | | | |

Activator Side (Part B)

| | | | | | | | | | | |
|---|---|---|---|---|---|---|---|---|---|---|
| AFR40 | 48.72 | 48.72 | 48.72 | 48.72 | 48.72 | 48.72 | 48.72 | 48.72 | 48.72 | 48.72 |
| Tamsil 8 | | | | | | | | | | |
| Tixogel VZ | 1.98 | 1.98 | 1.98 | 1.98 | 1.98 | 1.98 | 1.98 | 1.98 | 1.98 | 1.98 |
| Sand 100/140 | 48.95 | 48.95 | 48.95 | 48.95 | 48.95 | 48.95 | 48.95 | 48.95 | 48.95 | 48.95 |
| VC 80000 | 0.36 | 0.36 | 0.36 | 0.36 | 0.36 | 0.36 | 0.36 | 0.36 | 0.36 | 0.36 |

Physical Properties

| | | | | | | | | | | |
|---|---|---|---|---|---|---|---|---|---|---|
| Compressive Strength, psi | 14,059 | 9,584 | 14,670 | 13,598 | 14,670 | 9,562 | 11,657 | 14,670 | 10,908 | 14,670 |
| Tensile Strength, psi | 2,495 | 2,323 | 2,498 | 1,777 | 2,117 | 1,893 | 2,828 | 2,672 | 2,505 | 2,455 |
| Tensile Modulus, ksi | 1,228 | 1,484 | | | | | | | | |
| Shrinkage | 1.37% | 1.26% | 1.57% | 1.36% | 1.43% | 1.30% | 1.34% | 1.43% | 1.34% | 1.59% |

| | % Filler/% Monomer/% Glass DOE | | | | | | Optimization | Color and Pumpability Match | | |
|---|---|---|---|---|---|---|---|---|---|---|
| | A7 + -70 | A7 + -71 | A7 + -72 | A7 + -73 | A7 + -74 | A7 + -75 | A7 + -76 | A7 + -77 | A7 + -78 | A7 + -79 |

Resin Side (Part A)

| | | | | | | | | | | |
|---|---|---|---|---|---|---|---|---|---|---|
| C2208 | | | | | | | | | | |
| SR350 | | | | | | | | | | |
| SR540 | | | | | | | | | | |
| PRO12128 | 3.32% | 4.10% | 8.26% | 3.32% | 8.26% | 8.26% | 4.76% | 4.80% | 4.69% | 4.58% |
| SR833S | | | | | | | | | | |
| DION 9165 | 29.64% | 36.60% | 24.70% | 29.64% | 24.70% | 24.70% | 33.22% | 33.49% | 32.70% | 31.95% |
| Ethylene Glycol | | | | | | | | | 1.97% | 3.85% |
| HET | 0.40% | 0.50% | 0.40% | 0.40% | 0.40% | 0.40% | 0.47% | | | |
| NDM | 0.40% | 0.50% | 0.40% | 0.40% | 0.40% | 0.40% | 0.47% | 0.47% | 0.46% | 0.45% |
| F16332 | 0.24% | 0.30% | 0.24% | 0.24% | 0.24% | 0.24% | 0.28% | 0.47% | 0.46% | 0.45% |
| R202 | 1.94% | 2.40% | 1.94% | 1.94% | 1.94% | 1.94% | 2.00% | 0.28% | 0.28% | 0.27% |
| R974 | | | | | | | | 1.21% | 1.57% | 1.92% |
| BYK-605 | | | | | | | | 4.71% | 4.60% | 4.49% |
| BYK-E401 | | | | | | | | | | |
| TS720 | | | | | | | | | | |
| M9400 | 4.05% | 5.00% | 4.05% | 4.05% | 4.05% | 4.05% | 4.67% | | | |
| Glass Fibers | 11.98% | | 11.98% | 11.98% | 11.98% | | 5.35% | 5.39% | 5.27% | 5.14% |
| Sand 100/140 | | | | | | | | | | |

TABLE 2-continued

Anchoring Adhesive Compositions And Test Results

| | | | | | | | | | | |
|---|---|---|---|---|---|---|---|---|---|---|
| Silicosil 63 | 48.02% | 50.60% | 48.02% | 48.02% | 48.02% | 60.00% | 48.77% | 49.17% | 48.01% | 46.90% |
| R900 | | | | | | | | | | |

Activator Side (Part B)

| | | | | | | | | | | |
|---|---|---|---|---|---|---|---|---|---|---|
| AFR40 | 48.72 | 48.72 | 48.72 | 48.72 | 48.72 | 48.72 | 48.72 | 48.72 | 48.72 | 48.72 |
| Tamsil 8 | | | | | | | | | | |
| Tixogel VZ | 1.98 | 1.98 | 1.98 | 1.98 | 1.98 | 1.98 | 1.98 | 1.98 | 1.98 | 1.98 |
| Sand 100/140 | 48.95 | 48.95 | 48.95 | 48.95 | 48.95 | 48.95 | 48.95 | 48.95 | 48.95 | 48.95 |
| VC 80000 | 0.36 | 0.36 | 0.36 | 0.36 | 0.36 | 0.36 | 0.36 | 0.36 | 0.36 | 0.36 |

Physical Properties

| | | | | | | | | | | |
|---|---|---|---|---|---|---|---|---|---|---|
| Compressive Strength, psi | 14,670 | 13,549 | 11,946 | 14,670 | 12,519 | 14,090 | | | | |
| Tensile Strength, psi | 2,502 | 1,978 | 2,031 | 2,496 | 2,401 | 2,047 | | | | |
| Tensile Modulus, ksi | | | | | | | | | | |
| Shrinkage | 1.29% | 1.36% | 1.06% | 1.11% | 1.24% | 1.30% | 1.36% | | | |

| | Color and Pumpability Match | | | | R974/BYK605 5-Point Study | | | | | BYK E401 Ladder |
|---|---|---|---|---|---|---|---|---|---|---|
| | A7 + -80 | A7 + -81 | A7 + -82 | A7 + -83 | A7 + -84 | A7 + -85 | A7 + -86 | A7 + -87 | A7 + -88 | A7 + -89 |

Resin Side (Part A)

| | | | | | | | | | | |
|---|---|---|---|---|---|---|---|---|---|---|
| C2208 | | | | | | | | | | |
| SR350 | | | | | | | | | | |
| SR540 | | | | | | | | | | |
| PRO12128 | 4.61% | 4.77% | 4.77% | 4.75% | 4.75% | 4.75% | 4.75% | 4.75% | 4.75% | 4.75% |
| SR833S | | | | | | | | | | |
| DION 9165 | 32.19% | 33.26% | 33.29% | 33.19% | 33.19% | 33.19% | 33.19% | 33.19% | 33.19% | 33.19% |
| Ethylene Glycol | 3.88% | | | | | | | | | |
| HET | | | | 0.47% | 0.47% | 0.47% | 0.47% | 0.47% | 0.47% | 0.47% |
| NDM | 0.46% | 0.47% | 0.47% | 0.47% | 0.47% | 0.47% | 0.47% | 0.47% | 0.47% | 0.47% |
| F16332 | 0.46% | 0.47% | 0.47% | 0.29% | 0.29% | 0.29% | 0.29% | 0.29% | 0.29% | 0.29% |
| R202 | 0.27% | 0.28% | 0.28% | 1.86% | | | | | | |
| R974 | 1.16% | 1.60% | 1.60% | | 1.00% | 1.00% | 2.00% | 3.00% | 3.00% | |
| BYK-605 | 4.53% | 4.68% | 4.68% | | 0.20% | 0.50% | 0.70% | 0.60% | 1.50% | |
| BYK-E401 | | | | | | | | | | 0.10% |
| TS720 | | | | | | | | | | |
| M9400 | | | | 4.67% | 4.67% | 4.67% | 4.67% | 4.67% | 4.67% | 4.67% |
| Glass Fibers | 5.18% | 5.36% | 5.36% | 5.35% | 5.35% | 5.35% | 5.35% | 5.35% | 5.35% | 5.35% |
| Sand 100/140 | | | | | | | | | | |
| Silicosil 63 | 47.26% | 48.83% | 48.87% | 48.74% | 48.74% | 48.74% | 48.74% | 48.74% | 48.74% | 48.74% |
| R900 | | 0.29% | 0.21% | 0.21% | 0.21% | 0.21% | 0.21% | 0.21% | 0.21% | 0.21% |

Activator Side (Part B)

| | | | | | | | | | | |
|---|---|---|---|---|---|---|---|---|---|---|
| AFR40 | 48.72 | 48.72 | 48.72 | 48.72 | 48.72 | 48.72 | 48.72 | 48.72 | 48.72 | 48.72 |
| Tamsil 8 | | | | | | | | | | |
| Tixogel VZ | 1.98 | 1.98 | 1.98 | 1.98 | 1.98 | 1.98 | 1.98 | 1.98 | 1.98 | 1.98 |
| Sand 100/140 | 48.95 | 48.95 | 48.95 | 48.95 | 48.95 | 48.95 | 48.95 | 48.95 | 48.95 | 48.95 |
| VC 80000 | 0.36 | 0.36 | 0.36 | 0.36 | 0.36 | 0.36 | 0.36 | 0.36 | 0.36 | 0.36 |

Physical Properties

| | |
|---|---|
| Compressive Strength, psi | |
| Tensile Strength, psi | |
| Tensile Modulus, ksi | |
| Shrinkage | |

| | BYK E401 Ladder | | TS720 Ladder | | | Final |
|---|---|---|---|---|---|---|
| | A7 + -90 | A7 + -91 | A7 + -92 | A7 + -93 | A7 + -94 | A7 + -95 |

Resin Side (Part A)

| | | | | | | |
|---|---|---|---|---|---|---|
| C2208 | | | | | | |
| SR350 | | | | | | |
| SR540 | | | | | | |
| PRO12128 | 4.75% | 4.75% | 4.75% | 4.75% | 4.75% | 4.75% |
| SR833S | | | | | | |
| DION 9165 | 33.19% | 33.19% | 33.19% | 33.19% | 33.19% | 33.15% |
| Ethylene Glycol | | | | | | |
| HET | 0.47% | 0.47% | 0.47% | 0.47% | 0.47% | 0.47% |
| NDM | 0.47% | 0.47% | 0.47% | 0.47% | 0.47% | 0.47% |
| F16332 | 0.29% | 0.29% | 0.29% | 0.29% | 0.29% | 0.28% |
| R202 | | | | | | |
| R974 | | | | | | 1.09% |
| BYK-605 | | | | | | 0.20% |
| BYK-E401 | 0.50% | 1.00% | | | | |
| TS720 | | | 1.00% | 2.00% | 3.00% | |

TABLE 2-continued

Anchoring Adhesive Compositions And Test Results

| | | | | | | |
|---|---|---|---|---|---|---|
| M9400 | 4.67% | 4.67% | 4.67% | 4.67% | 4.67% | 4.95% |
| Glass Fibers | 5.35% | 5.35% | 5.35% | 5.35% | 5.35% | 4.95% |
| Sand 100/140 | | | | | | |
| Silicosil 63 | 48.74% | 48.74% | 48.74% | 48.74% | 48.74% | 49.48% |
| R900 | 0.21% | 0.21% | 0.21% | 0.21% | 0.21% | 0.21% |
| Activator Side (Part B) | | | | | | |
| AFR40 | 48.72 | 48.72 | 48.72 | 48.72 | 48.72 | 48.72 |
| Tamsil 8 | | | | | | |
| Tixogel VZ | 1.98 | 1.98 | 1.98 | 1.98 | 1.98 | 1.98 |
| Sand 100/140 | 48.95 | 48.95 | 48.95 | 48.95 | 48.95 | 48.95 |
| VC 80000 | 0.36 | 0.36 | 0.36 | 0.36 | 0.36 | 0.36 |
| Physical Properties | | | | | | |
| Compressive Strength, psi | | | | | | |
| Tensile Strength, psi | | | | | | |
| Tensile Modulus, ksi | | | | | | |
| Shrinkage | | | | | | |

Test Procedures Used for Examples

Compression Testing

Anchoring adhesive ingredients were mixed and molded into cylindrical samples having a 1.25 inch diameter and 1-inch length, to approximately simulate the size and shape of anchoring adhesive typically formed in a borehole. The samples were cured for at least 24 hours at ambient conditions, and were placed in a universal flat plate testing machine. The samples were compressed at a rate of 0.1 inch per minute while the force and deflection were measured until the sample failed or the deflection reached 0.4 inch. The maximum compressive force was recorded.

Tensile Testing

Dog-bone shaped samples were molded according to the shape illustrated in FIGS. 1-3, and were cured at ambient conditions for at least 24 hours. The dimensions A-K indicated in the drawings were as follows:

| | |
|---|---|
| A | 0.25 in. |
| B | 0.35 in. |
| C | 0.25 in. |
| D | 184.6° |
| E | 1.00 in. |
| F | 1.25 in. |
| G | 2.00 in. |
| H | 1.25 in. |
| I | 1.00 in. |
| J | 0.25 in. |
| K | 7.00 in. |
| L | 0.25 in. |

The test samples were placed in the groups of a large Instron 5586 tensile tester with a 2000-lb load cell adapter and pulled at a speed of 0.2 in. per minute. The force and deflection were measured until the sample failed. The maximum tensile force was recorded.

Shrinkage Testing

The same molded samples used for compression testing were used to measure shrinkage. After the sampled were cured for 24 hours, the diameters of their bases were measured and compared to the mold diameter. The shrinkage was calculated according to the equation:

$$\text{Shrinkage} = \left(1 - \frac{\text{sample diameter}}{\text{mold diameter}}\right) \times 100\%$$

While the embodiments of the invention described herein are presently preferred, various modifications and improvements can be made without departing from the spirit and scope of the invention. The scope of the invention is defined by the appended claims, and all changes that fall within the meaning and range of equivalents are intended to be embraced therein.

I claim:

1. An anchoring adhesive, comprising:
    a first part A and a second part B present in a weight ratio of about 1:4 to about 40:1;
    the first part A comprising about 1-30% by weight of an isocyanurate compound, about 3-50% by weight of a vinyl ester compound, about 20-70% by weight of one or more fillers and zero to about 40% by weight additional monomer, wherein the additional monomer, when present, is selected from the group consisting of a vinyl monomer, an acrylate monomer, a diacrylate monomer, and combinations thereof;
    the second part B comprising a free radical initiator;
    wherein the anchoring adhesive withstands a tensile force of 1501 psi, and a compressive force of 9562 psi.

2. The anchoring adhesive of claim 1, wherein the isocyanurate compound is selected from the group consisting of compounds having the following chemical formula:

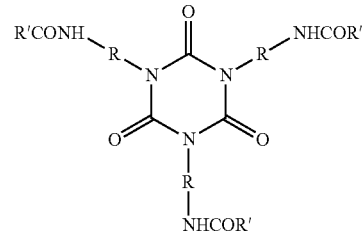

wherein each R and R' is allyl, alkyl or aryl.

3. The anchoring adhesive of claim 1, wherein the isocyanurate compound is selected from the group consisting of isocyanurate acrylates, isocyanurate diacrylates, isocyanurate triacrylates, and combinations thereof.

4. The anchoring adhesive of claim 3, wherein the isocyanurate compound comprises tris(2-hydroxy ethyl)isocyanurate triacrylate.

5. The anchoring adhesive of claim 1, wherein the isocyanurate compound is a monomer and the vinyl ester compound is a polymer.

6. The anchoring adhesive of claim 1, wherein the vinyl ester compound is selected from the group consisting of compounds having the following chemical formula:

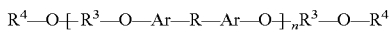

wherein
  Ar is a substituted or unsubstituted aromatic radical with a valence of at least two,
  R is independently a substituted or unsubstituted divalent radical derived from alkyl or arylalkyl,
  $R^3$ is a hydroxy substituted divalent radical derived from an alkyl radical,
  $R^4$ is independently a vinyl carboxy radical or a epoxy radical, provided that the ratio of n to the number of vinyl carboxy $R^4$ groups is, on average for the composition, from about 0.4 to about 2.0, and
  n is from 1 to 5.

7. The anchoring adhesive of claim 1, wherein the vinyl ester compound is selected from the group consisting of compounds having the following chemical formula:

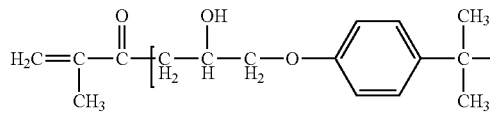

wherein n is from 1 to about 5 and wherein the ratio of n to the terminal vinyl units is, on average for the composition, from about 0.4 to about 2.0.

8. The anchoring adhesive of claim 1, wherein the first part A comprises about 1-10% by weight of an isocyanurate triacrylate, about 2-20% by weight of an additional acrylate monomer, about 8-30% by weight of the vinyl ester compound, about 2-20% by weight of an additional vinyl monomer, and about 30-70% by weight of one or more fillers.

9. The anchoring adhesive of claim 1, wherein the second part B comprises about 5-80% by weight of the free radical initiator, about 20-80% by weight of a thickening agent, and zero to about 50% by weight of a liquid carrier.

10. The anchoring adhesive of claim 1, wherein the free radical initiator is selected from the group consisting of peroxide compounds, tertiary amine compounds, aldehyde amine compounds, organic sulfonyl chlorides, and combinations thereof.

11. The anchoring adhesive of claim 1 comprising:
a first part A and a second part B in a ratio of about 1:3 to about 30:1;
wherein the isocyanurate compound is selected from the group consisting of compounds having the following chemical formula:

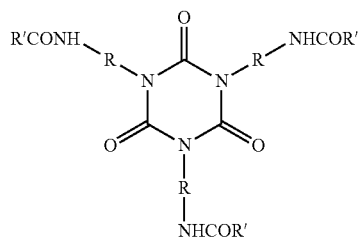

wherein each R and R' is allyl, alkyl or aryl;
and the vinyl ester compound is selected from the group consisting of compounds having the following chemical formula:

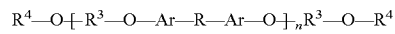

wherein
  Ar is a substituted or unsubstituted aromatic radical with a valence of at least two,
  R is independently a substituted or unsubstituted divalent radical derived from alkyl or arylalkyl,
  $R^3$ is a hydroxy substituted divalent radical derived from an alkyl radical,
  $R^4$ is independently a vinyl carboxy radical or a epoxy radical, provided that the ratio of n to the number of vinyl carboxy $R^4$ groups is, on average for the composition, from about 0.4 to about 2.0, and
  n is from 1 to 5.

12. The anchoring adhesive of claim 11, wherein the first part A comprises about 1-30% by weight of the isocryanurate compound, about 3-50% by weight of the vinyl ester compound, zero to about 40% by weight of one or more additional monomers, and about 20-70% by weight of one or more fillers.

13. The anchoring adhesive of claim 11, wherein the first part A comprises about 2-10% by weight of an isocyanurate triacrylate, about 2-20% by weight of an additional acrylate monomer, about 8-30% by weight of the vinyl ester compound, about 2-20% by weight of an additional vinyl monomer, and about 30-70% by weight of one or more fillers.

14. The anchoring adhesive of claim 11, wherein the second part B comprises about 5-80% by weight of the free radical initiator, about 20-80% by weight of a thickening agent, and zero to about 50% by weight of a liquid carrier.

15. The anchoring adhesive of claim 11, wherein the second part B comprises about 10-50% by weight of the free radical initiator, about 20-50% by weight of a thickening agent, and about 15-40% by weight of a liquid carrier.

16. The anchoring adhesive of claim 11, wherein the first part A is contained in a first capsule and the second part B is contained in a second capsule.

17. The anchoring adhesive of claim 16, wherein the first capsule is smaller than second capsule and is contained therein or the second capsule is smaller than the first capsule and is contained therein.

18. The anchoring adhesive of claim 11, wherein the free radical initiator is selected from the group consisting of peroxide compounds, tertiary amine compounds, aldehyde amine compounds, organic sulfonyl chlorides, and combinations thereof.

19. An anchoring adhesive, comprising:
a first part A and a second part B present in a weight ratio of about 1:2 to about 20:1;
the first part A comprising about 1-30% by weight of an isocyanurate compound selected from the group consisting of isocyanurate acrylates, isocyanurate diacrylates, isocyanurate triacrylates, and combinations thereof, and about 3-50% by weight of a vinyl ester compound, about 20-70% by weight of one or more fillers and zero to about 40% by weight of an additional monomer, wherein the additional monomer, when present, is selected from the group consisting of a vinyl monomer, an acrylate monomer, a diacrylate monomer, and combinations thereof;

the second part B comprising a free radical initiator selected from the group consisting of peroxide compounds, tertiary amine compounds, aldehyde amine compounds, organic sulfonyl chlorides, and combinations thereof;

wherein the anchoring adhesive withstands a tensile force of 1501 psi, and a compressive force of 9562 psi.

* * * * *